United States Patent [19]
Willey

[11] Patent Number: 5,253,829
[45] Date of Patent: * Oct. 19, 1993

[54] VEHICLE SUNROOF DEFLECTOR AND MOUNTING SYSTEM

[75] Inventor: Barry A. Willey, Maywood, Ill.

[73] Assignee: National Cycle, Inc., Maywood, Ill.

[ * ] Notice: The portion of the term of this patent subsequent to Apr. 19, 2009 has been disclaimed.

[21] Appl. No.: 314,872

[22] Filed: Feb. 23, 1989

[51] Int. Cl.$^5$ .............................................. B60J 7/22
[52] U.S. Cl. ...................................... 296/217; 296/91
[58] Field of Search .................... 296/217, 180 L, 91

[56] References Cited

U.S. PATENT DOCUMENTS

| | | | |
|---|---|---|---|
| 4,171,846 | 10/1979 | Isleif et al. | 296/217 |
| 4,362,332 | 12/1982 | Garnham | 296/217 |
| 4,396,224 | 8/1983 | Hayakawa | 296/217 |
| 4,446,179 | 5/1984 | Waugh | 293/128 X |
| 4,447,086 | 5/1984 | Roos et al. | 296/217 |
| 4,480,869 | 11/1984 | Splithoff | 296/217 |
| 4,750,782 | 6/1988 | Turner | 296/217 |

FOREIGN PATENT DOCUMENTS

| | | | |
|---|---|---|---|
| 2154707 | 5/1973 | Fed. Rep. of Germany | 296/217 |
| 6603193 | 9/1967 | Netherlands | 296/217 |

Primary Examiner—Dennis H. Pedder
Attorney, Agent, or Firm—James T. FitzGibbon; Angelo J. Bufalino

[57] ABSTRACT

An air deflector for a roof opening has an upper shield unit and a lower mounting strip. The mounting strip has a narrow portion to allow flexibility in conforming to the roof surface.

7 Claims, 1 Drawing Sheet

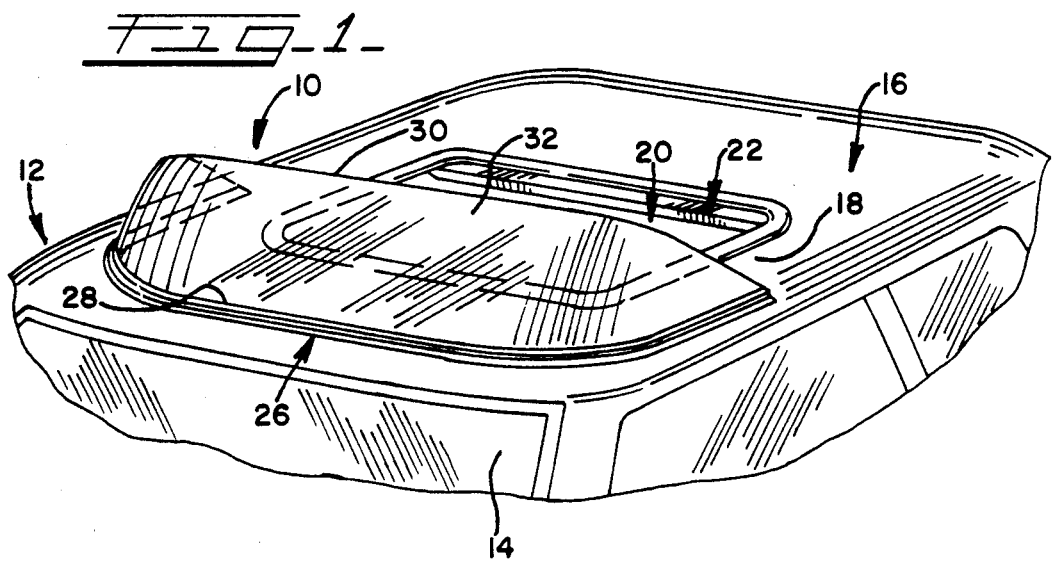
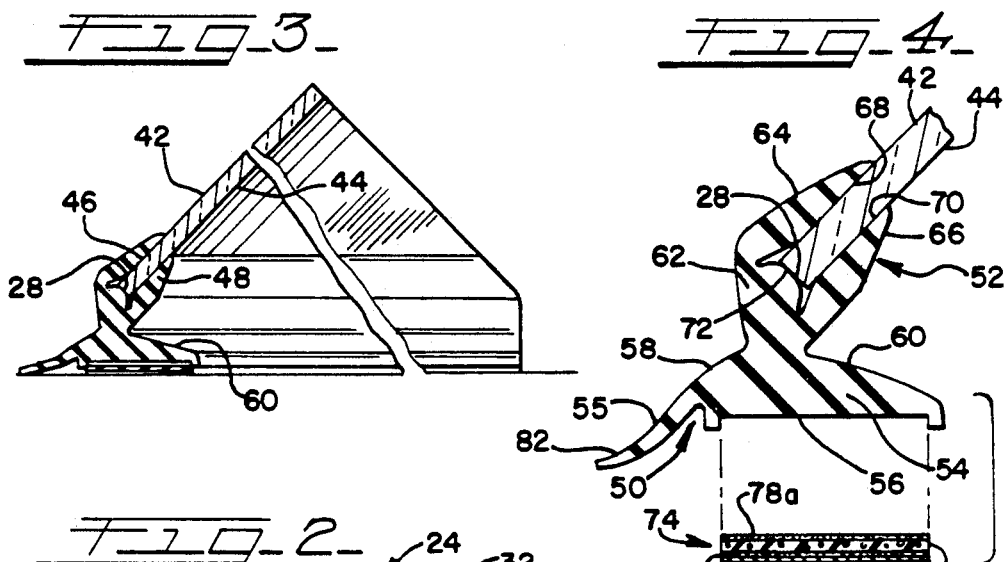
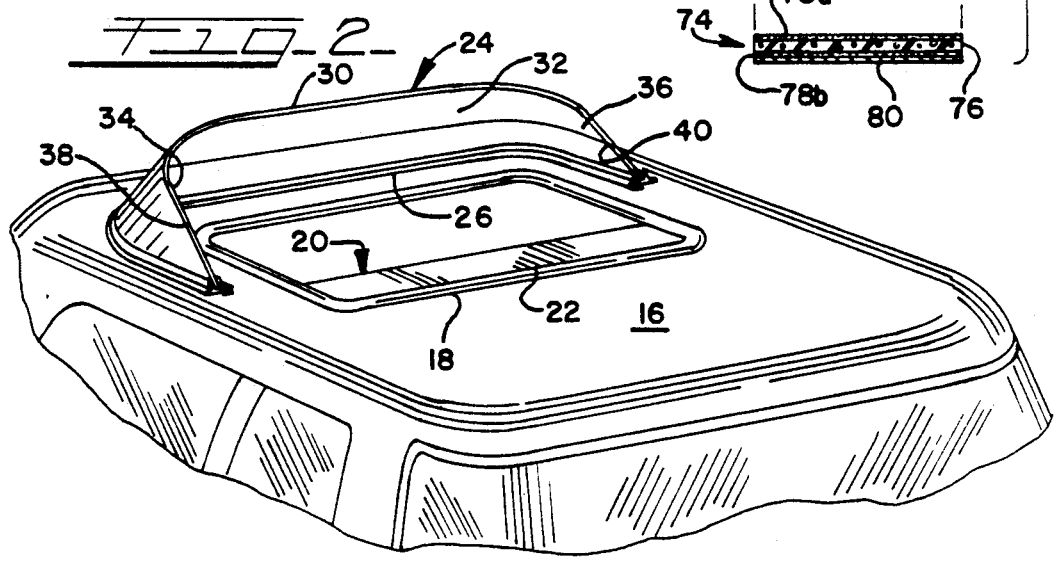

VEHICLE SUNROOF DEFLECTOR AND MOUNTING SYSTEM

The present invention relates generally to air deflectors for vehicle roofs, usually called sunroof air deflectors, and more particularly, to a deflector assembly having a self-contained mounting system to form what might be termed a universal vehicle sunroof air deflector.

In recent years, the vehicle sunroof has become an increasingly popular accessory for closed top automobiles, such as coupes and sedans. The attraction of a vehicle sunroof is that of providing the open air capabilities of a convertible coupe or sedan, while at the same time retaining the structural solidity and safety potential of a closed roof vehicle.

In addition to the advantages of a roof opening, sunroofs have become more popular as their reliability of operation has continued to increase. While some earlier sunroofs were either of a somewhat unattractive construction or were not particularly reliable in use, most modern sunroofs are quite inconspicuous when not open, and are either incorporated into the vehicle at the factory or have an "as-manufactured" look, rather than the "add-on" look of an accessory.

Low cost sunroofs of the tilt-up type have provided a low cost option for those desiring a vehicle sunroof but not wishing to have the highly mechanized, retractable form of sunroof available to those willing to pay a higher price for this construction. At any rate, while the sunroof has the obvious advantages of additional ventilation, fresh air exposure and increased visibility, the wind noise associated with their operation at higher speeds may create an unpleasant distraction for the driver or vehicle passengers.

In addition, where a vehicle sunroof opening provides a low pressure area, or in certain other cases, the sunroof may permit the entry of debris and dust or rain, which might otherwise might be excluded from the vehicle.

Accordingly, it has been proposed to provide a windshield or air deflector for the sunroof. A number of sunroof air deflector constructions have been provided for this purpose, but as far as it is known, the solutions heretofore provided have not been satisfactory, especially for the manufacturer or merchant, and in many cases, the ultimate user. This is because almost invariably, a vehicle top is a contoured structure having curves lying in different planes. Hence, if it is attempted to provide a rigid shield for a sunroof, it would have appeared necessary to cause the deflector to be matched to each different style vehicle with which it is intended to be used. Needless to say, this creates the problem of manufacturing and stocking a very large number of different sizes and styles in order to meet the requirements of a great variety of vehicles.

Clearly, where the deflector is intended to provide both wind wings or side edge portions as well as a principal or center section portion, the problem becomes more difficult, insofar as most compound curved structures tend to become rigid and hence do not readily accommodate different vehicle contours.

Thus, for example, tilting the shield to lower the wing portions into conformity with a vehicle roof may tend to cause the structure to rock about a transition point lying between the leading edge of the shield and the wings, raising another part of the shield away from the vehicle body. Where the structure itself has been able to be deflected so as to cause its leading edge to lie generally along the contours of the vehicle roof, accommodation has not been able to be made by known mounting arrangements to accommodate this movement, and consequently the mounting has been clumsy, or air gaps or spaces between the lower shield edge and the vehicle roof have remained. Of course, where residual strains are present in mountings achieved by deflecting relatively rigid materials, stress concentrations may cause premature failure of the shield; if the mount is adhesive, the adhesive may cold flow and eventually separate within a relatively short time.

Accordingly, in view of the failure of the prior art to provide a mounting system for sunroof air deflectors which is capable of satisfactory attachment to a large variety of vehicles, it is an object of the present invention to provide an improved sunroof air deflector.

It is another object of the present invention to provide a sunroof air deflector unit which permits snug, easy installation on a variety of vehicles having roofs with various compound curvatures.

A still further object of the invention is to provide a mounting strip arrangement which is adaptable for use with sunroof air deflector shields so as to provide a combination of rigidity and flexibility not heretofore available.

A still further object of the invention is to provide a low cost vehicle sunroof air deflector which is adaptable to a large variety of vehicle sizes and shapes without compromising function and high quality appearance.

A still further object of the invention is to provide a mounting system which includes a sunroof air deflector mounting strip embodying, in a single unit, a three surface, shield-engaging portion, a flexible neck portion and an enlarged mounting body portion capable of receiving an adhesive system for mounting directly to the vehicle roof.

A further object is to provide a mounting strip of novel profile having a number of features, including optional features, embodied in a low cost single unit.

Another object of the invention is to provide a mounting strip for use in combination with the thermoplastic shield of a sunroof air deflector which strip permits adhesive attachment to the lower margins of the shield and also permits relatively strain free attachment of the strip to a contoured vehicle roof, with portions of the strains being accommodated in the neck or transition portion of the mounting strip.

The foregoing and other objects and advantages of the invention are achieved in practice by providing an air deflector unit for adhesive mounting to a vehicle roof, with the deflector assembly having a contoured shield with center and spaced apart wing portions, continuous lower inner and outer mounting surfaces received in a mounting strip having an upper body with flaps for engaging these mounting surfaces, a lower body portion with an adhesive receiving area and a flexible neck portion extending between the upper and lower body portions of the mounting strip, permitting it to flex in more than one place.

The manner in which the foregoing and other objects and advantages of the invention are achieved in practice will become more clearly apparent when reference is made to the following detailed description of the preferred embodiments of the invention set forth by way of example and shown in the accompanying drawings, in

BRIEF DESCRIPTION OF THE DRAWINGS

FIG. 1 is a perspective view of the sunroof air deflector of the invention, showing the outer, front portion of the unit in position of use atop a vehicle roof;

FIG. 2 is a perspective view of the shield taken from the rear;

FIG. 3 is an enlarged vertical sectional view, with portions broken away, showing portions of the air deflector shield and the shield mounting strip;

FIG. 4 is a further enlarged vertical sectional view of the mounting strip unit of the invention.

DESCRIPTION OF THE PREFERRED EMBODIMENTS OF THE INVENTION

While the deflector assembly of the invention is adaptable to vehicles generally, including automobiles and boats, and the like, and may be used as a decorative accessory even on vehicles not provided with sunroofs, a detailed description of the preferred form of the invention will be given in relation to a vehicle of the sedan or coupe type having a sunroof positioned in an opening near the front and center of the vehicle top.

Referring now to the drawings in greater detail, a self-contained air deflector for adhesive mounting, sometimes simply called a "sunroof air deflector" and generally designated 10 is shown to embody the invention. The unit 10 is mounted atop a vehicle generally designated 12 and shown to include its own vehicle windshield 14, and a vehicle roof portion generally designated 16. The upper surface of the vehicle roof 16 is contoured so as to be curved from side to side as well as from front to rear. The roof includes one or more margins 18 extending around and defining an opening generally designated 20 in which a retractable or otherwise displaceable cover unit 22 is disposed.

As shown in FIGS. 1 and 2, the sunroof unit 10 comprises two principal components, including a contoured shield unit, generally designated 24, and a mounting strip unit generally designated 26. The shield unit 24 includes a continuous lower or leading edge 28 (FIG. 3), an upper edge 30 having a portion lying generally parallel to the lower edge 28 at the centermost portions thereof. As shown most clearly in FIGS. 1 and 2, the parallel center portions of the edges 28 and 30 define a windshield center portion 32. The shield unit 24 also includes, in the orientation of the vehicle, left and right hand wing portions 34 and 36, respectively, defined by the laterally extending outer ends of the edges 28, 30. For purposes of illustration, the end portions 38 and 40 of the upper edge 30 are shown to simply taper back and converge with the end of the lower edge 28. It will be understood, however, that the side wings 34, 36 may be of any suitable configuration.

Referring now to FIG. 3, for example, it will be noted that the shield unit 24 includes in relation to the vehicle interior, outwardly and inwardly directed shield surfaces 42 and 44. The outer and inner lower margins 46 and 48, respectively, of surfaces 42 and 44 form attachment points or surfaces for the mounting strip 26.

Referring now to the mounting strip, generally designated 26, a preferred form of this unit is shown in enlarged cross section in FIG. 4 to include a lower or vehicle mounting portion generally designated 50 and an upper or shield mounting portion generally designated 52. The lower portion includes a body 54 having a downwardly directed, tape receiving surface 56. An optional, but sometimes important feature is a leading edge seal strip 55 which extends forwardly from a part of the body 54 closely overlying the vehicle roof 16. A pair of shoulder surfaces 58, 60, which generally taper towards each other, define the remainder of the lower body 54. A reduced thickness neck portion 62 is mounted on the shoulders 58, 60 and serves to join the lower body 54 to the upper portion 52. This upper or windshield mounting portion 52 includes flexible outer and inner, i.e., leading and trailing edge flaps 64, 66 which include opposed facing surfaces 68, 70 for adhesive mounting to the lower margins 46, 48 of the shield. An abutment surface or channel bottom surface 72 abuts the lower edge 28 of the shield.

A desirable feature of the invention is that the flaps are defined by cuts extending well into the body 52 so as to permit flexibility and the retention of adhesive in this area.

Referring now to the adhesive component, it is shown that the preferred form of adhesive mounting means is a flexible tape strip 74 with adhesive on both sides. One side is bonded to the mounting strip 26 along the tape receiving surface 56 and the other side provides a pressure-sensitive adhesive surface for use by the customer in installation of the deflector 10. As shown, therefore, there is a tape generally designated 74 in the form of a continuous, relatively tough strip preferably having a main body 76 made from a high density foam material, an adhesive upper layer 78a for joining this foam strip body 76 to the tape receiving surface 56 of the mounting strip lower body 54. The tape 74 further includes a strip of adhesive 78b lying along the lower surface of the body 76, and this strip 78b is covered with a release coating sheet 80 which is also preferably a thin, flexible, plastic sheet material.

The bond between the strip 74 and the surface 56 may be a permanent, cured bond or be a bond formed from a pressure-sensitive adhesive, with or without augmentation by heat, pressure, ultrasonic energy or the like.

Referring in particular to FIGS. 3 and 4, it will be noted that in the one preferred form, a deflector strip 55 is provided on the leading edge or outer shoulder 58 of the lower sealing strip body 54. This strip 55 normally has a leading edge portion 82 which, in the relaxed or as-molded condition of the strip, lies beneath the level of the lower surface 56. Accordingly, when the unit 10 is installed, the inherent resiliency of the as-molded edge portion 82 is overcome. However, even after installation, residual stresses urge the edge 82 into a water- and dirt-excluding relation to the vehicle top 16 so that foreign materials do not tend to enter the area wherein the adhesive strip is disposed.

Referring now to the operation of the device, when it is desired to use the deflector unit of the invention, it is only necessary for the user to remove the release paper 80 from covering the adhesive layer 78b forming the lower portion of the adhesive strip 74. This exposes the tacky surface of the adhesive and the assembly may be placed as shown so as to surround the sunroof, if present, on the vehicle in question. In some cases, positioning of the deflector unit 10 may be enhanced by placing a thin film of soapy water on the vehicle roof. This permits the adhesive to delay its adhesive action until the water is absorbed or evaporates, whereupon a strong adhesive bond is provided. In the simple form of a windshield, as shown, there may be a slight overall contour to the main or center portion 32 of the shield 24 and a certain amount of compound curvature may exist with respect to the wings 34 and 36. However, the shield 24 will still be flexible in two planes.

When the mounting is accomplished, whatever bending is required by the contours of the vehicle roof 16 will be readily accommodated by the combination of flexibility afforded by the plastic material from which the shield 24 is made and particularly that of the mounting strip 26. The reduced diameter neck portion 62 is believed to allow flexibility so that the lower body 54 of the mounting strip 26 may move into different planes and move on to different levels without creation of excessive strain; this is accounted for by making the mounting strip 26 from an elastomeric material. When the shield is in place, the entire lower edge is strongly secured and the structure as a whole becomes rigid.

The materials of construction may vary somewhat, but it is preferred that the shield itself be an acrylic material such as polymethylmethacrylate or a Lexan brand or equivalent polycarbonate transparent plastic material. The shield may be opaque, smoked, or transparent. The mounting strip is preferably made from a synthetic rubber such as a butadiene or a nitrile rubber. The adhesive used to mount the shield to the mounting strip may be a one or two component adhesive of the curable or thermoplastic kind and its selection is not critical to the practice of the invention. The provision of shield engaging surfaces in the form of flaps 64 and 66 allows small wells or reservoirs for adhesive mounting and the surface 72 may serve as a bottom stop as well as an adhesive mounting surface for the lower edge 28.

The novel self-adhesive attachment system of the present invention consisting of the tape with the removable release coating and the contour of the mounting strip combined with the contoured shield provides a vehicle accessory which is both decorative and functional in use and which overcomes the various drawbacks of prior art systems by providing both ease and permanency of mountings. The relatively stress-free mounting provides long useful product life. The system does away entirely with the need for any method of engaging any part of the sunroof opening, and particularly of the need to insert fasteners, brackets or braces therein, all of which are unsightly and add extra costs to the unit while tending to compromise the operation of the sunroof.

It will thus be seen that the present invention provides a novel air deflector for use in surrounding portions of a vehicle sunroof or otherwise acting as a decorative accessory with such deflector having a number of advantages and characteristics including those previously pointed out and others which are inherent in the invention. A preferred form of this invention having been described by way of example, it is anticipated that variations and modifications to this form of construction will occur to those skilled in the art and that such changes and modifications may be made without departing from the spirit of the invention or the scope of the appended claims.

I claim:

1. A self-contained air deflector assembly for adhesive mounting to a vehicle roof, said air deflector assembly comprising, in combination, a shield unit and an elongated elastomeric mounting strip unit, said shield unit being made from a single sheet of material and contoured to provide a shield center portion and a pair of opposed, swept back wing portions, said shield center and said wing portions being defined in part by continuous inwardly and outwardly facing, spaced apart lower mounting surface margins and a lower shield edge portion extending between and joining said lower mounting surface margins to provide a continuous engagement area for said mounting strip, said mounting strip including a lower body portion defined in part by a downwardly facing, adhesive-receiving surface and in part by inner and outer shoulder surfaces extending upwardly from said adhesive-receiving surface and converging towards each other, an upper body portion including inner and outer, flexible mounting flaps having opposed, first and second shield-engaging surfaces lying generally parallel to and spaced apart from each other and engaging respective ones of said mounting surface margins of said shield unit, said upper body also including a third surface extending between and joining the lower edges of said shield-engaging surfaces, and inner and outer, downwardly converging exterior surfaces, with said strip further including a flexible neck portion extending between and joining said upper and lower body portions, said flexible neck portion being defined by surfaces extending respectively between the upper ends of said converging shoulder surfaces and the lower ends of said downwardly converging exterior surfaces, and means for adhesively securing said mounting strip to a vehicle roof, said adhesive means being positioned on said adhesive-receiving surface of said mounting strip unit, whereby said shield unit associated therewith may be adhesively secured to the roof of an associated vehicle.

2. An assembly as defined in claim 1 wherein said mounting strip unit is made entirely of rubber.

3. An assembly as defined in claim 1 wherein said shield material is made from an acrylic plastic sheet material.

4. An assembly as defined in claim 1 wherein said shield unit is made from a polycarbonate sheet material.

5. An assembly as defined in claim 1 wherein the body portion of said adhesive means is a tape made from a sponge material.

6. An assembly as defined in claim 5 wherein said tape includes a surface engaging adhesive layer which is covered with a removable release cover sheet.

7. An assembly as defined in claim 1 wherein said adhesive-receiving surface is a horizontally extending surface and wherein a leading edge of said lower body portion includes a thin web extending outwardly and downwardly from said outer shoulder surface, said web having an end portion, which in the unstressed condition of said web, lies below said adhesive receiving surface.

* * * * *